UNITED STATES PATENT OFFICE.

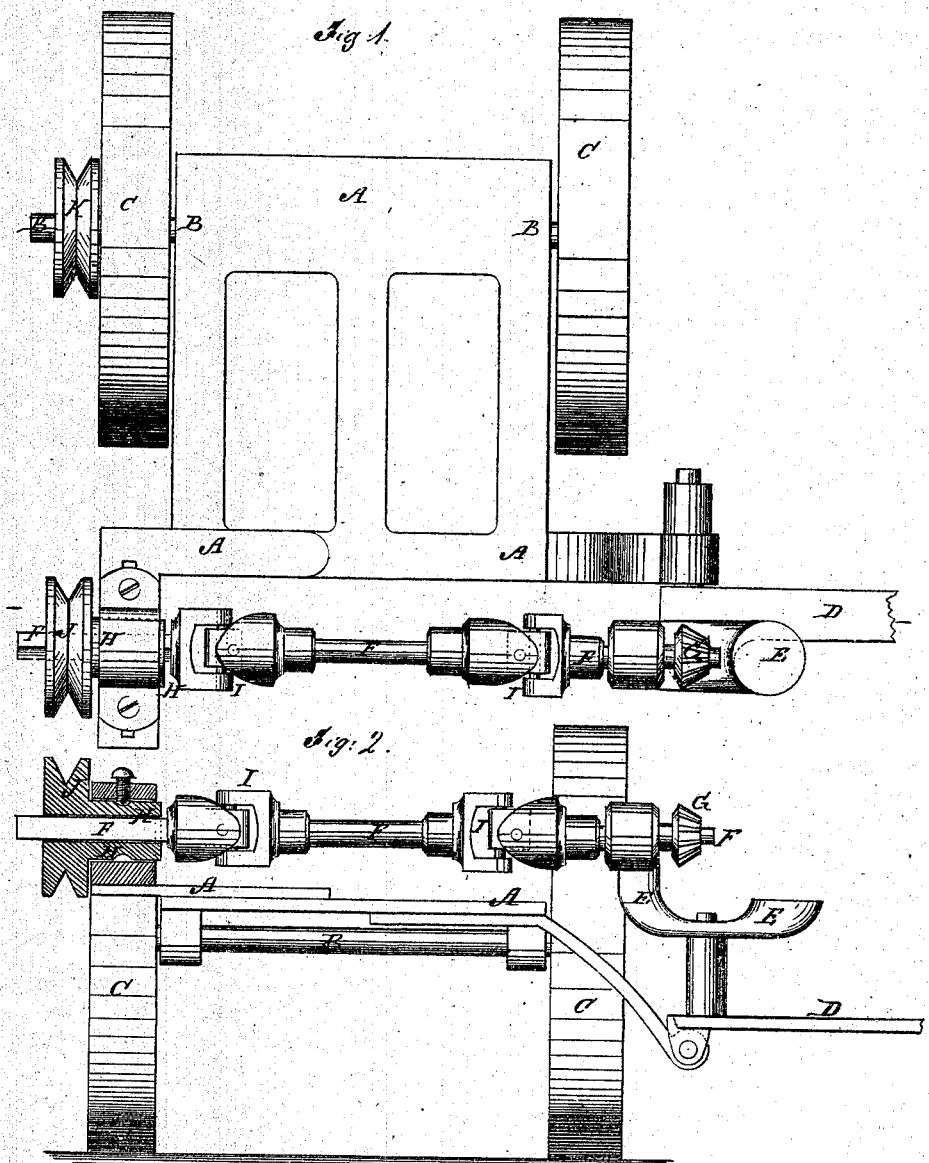

DAVID R. KINYON, OF RARITAN, NEW JERSEY, ASSIGNOR TO HIMSELF AND JOB C. KINYON, OF SAME PLACE.

IMPROVEMENT IN HARVESTER-RAKES.

Specification forming part of Letters Patent No. 112,605, dated March 14, 1871.

*To all whom it may concern:*

Be it known that I, DAVID R. KINYON, of Raritan, in the county of Somerset and State of New Jersey, have invented a new and useful Improvement in Operating Harvester-Rakes; and I do hereby declare that the following is a full, clear, and exact description thereof, which will enable others skilled in the art to make and use the same, reference being had to the accompanying drawing, forming part of this specification, in which—

Figure 1 is a top view of my improved device as connected with the frame and cutter-bar of a harvester. Fig. 2 is a rear view of the same, partly in section, to show the construction.

Similar letters of reference indicate corresponding parts.

My invention relates to improvements in that class of harvesters in which the driving-pulleys of the rake-shaft are arranged on the outer side of the machine, so that the inner end of the cutter-bar may be brought close to the driving or transporting wheel on the same side.

The invention consists in the construction and arrangement of parts, whereby certain advantages in the operation of the machine are secured, as hereinafter described.

A represents the frame of a harvester in bearings, attached to which the axle or drive-wheel shaft B revolves. C are the drive-wheels, which revolve loosely upon the shaft B, and are connected with said shaft, so as to carry it with them, in their forward movement, by pawls and ratchet-wheels, in the ordinary manner. D represents the cutter-bar, which is connected with the frame A, and operated in the ordinary manner. E represents the stand that supports the rake in bearings, in the inner part of which revolves the shaft F, which has a small bevel-gear wheel, G, attached to its projecting end, by which the rake is operated. The other end of the shaft F is squared off, and passes through a square hole in the sleeve H, which sleeve revolves in bearings attached to the rear part of the frame A, or to a support attached to said rear part of the frame A.

In the middle part of the shaft F, between its two bearings, are formed two universal joints I, one being near each bearing, so that the said shaft may adjust itself as the cutter-bar moves over the uneven surface of the ground, and so that the journals of said shaft may always pass squarely through their bearings without the possibility of binding, however rough the surface of the ground may be, the squared end of said shaft sliding freely in the sleeve H as its other moves up and down through the arc of a circle.

J is a band-wheel which is securely attached to or formed solidly upon the end of the sleeve H, and around which passes a band, which also passes around the wheel K, attached to the driving-shaft B, upon the side of the frame A farthest from the cutting-bar, and either upon the outside or inside of the driving-wheel C, as may be desired.

By this construction, by arranging the shaft F that operates the rake across the rear end of the frame A, and driving said shaft from the side of the frame A farthest from the cutter-bar, I am enabled to bring the cutter-bar closer to the frame A, making the machine more compact and greatly diminishing the side draft.

The bearing H of the shaft F and pulley J is adjustable toward and from the wheel C in front by means of screw-bolts, which pass through long slots in the part of the frame extended rearward. Screw-nuts are placed on the lower ends of said bolts, so that the bearing may be clamped in any desired position. This construction permits the belt or band on the pulleys J and K to be tightened when, from any cause, it has become slackened; or the adjustment may be so made as to slacken the band for the purpose of arresting the rotation of the rake, which is frequently necessary in going to and from the harvest-field and elsewhere about the farm.

Another advantage derived from this arrangement consists in preserving the alignment of the pulley J with the pulley K, whatever be the distance between them. Thus there cannot at any time be an increase of friction by reason of the pulley J being at an inclination or angle (in a vertical plane) to that on the shaft B.

Having thus described my invention, I claim as new, and desire to secure by Letters Patent—

The combination, with the reel or rake of a harvester, of the shaft F, having the universal joints I I, the pulley J, provided with the sleeve H and secured in the bearing, made adjustable, as described, and the pulley K on the shaft B, all arranged to operate as shown and herein set forth.

DAVID R. KINYON.

Witnesses:
  THEO. FRELINGHUYSEN,
  JOSEPH H. DOTY.